June 5, 1934. E. DE LUCA 1,961,416
SPEED REGULATING DEVICE
Filed Dec. 24, 1932 2 Sheets-Sheet 2

Inventor: Ettore De Luca,
By: Smith, Michael and Gardiner,
Attorneys.

Patented June 5, 1934

1,961,416

UNITED STATES PATENT OFFICE 1,961,416

SPEED REGULATING DEVICE

Ettore de Luca, London, England, assignor to John Hogg Robertson, London, England Application December 24, 1932, Serial No. 648,777
In France February 29, 1932

6 Claims. (Cl. 171—221)

This invention relates to speed-regulating devices for electric motors, and has reference more particularly to electric motors employed for driving apparatus for the recording or reproduction of sound in association with moving pictures.

The invention has for its main object to provide for the operation of one or more electric motors at rigorously constant speed, without variation due to fluctuation of voltage or frequency of the source of current or to change in the load or resistance to motion. A further object is to provide for the synchronization at constant speed of two or more associated apparatus by employing a single motor operating at rigorously constant speed, for regulating the several motors driving the associated apparatus.

The invention employs for this purpose a flywheel having relatively high inertia, rotating with substantially constant frictional losses, and maintained at its normal speed by a steady driving force, so that the flywheel performs a constant number of revolutions in unit time, the driving force being supplied to the flywheel in the known manner through a spring or resilient coupling of any suitable type, engaged between the flywheel and an electric motor.

According to this invention, the electric motor has its commutator separated from the armature and driven by the flywheel. The motor may be employed for driving purposes or it may be arranged as a servomotor driving one or more separate current distributors which act as commutators to control the current supplied to one or more driving motors to be regulated; in either case the drive is taken from the motor shaft or armature by positive means and not through the spring or resilient coupling, whereas the flywheel being driven through the spring or resilient coupling has a limited freedom to float in relation to the motor shaft when the latter tends to move ahead of or to fall behind the constantly running flywheel and the commutator maintains a rigorously constant speed by reason of the flywheel inertia. The remote commutator of the first motor and likewise the separate distributor or each of the distributors may take the form of a stationary commutator with rotating brushes, the current supplied through the brushes being led from the stationary contacts or segments to the windings of the respective motors.

Thus any small relative movement or angular displacement between the floating flywheel and the regulating motor or servomotor causes the rotating brushes to feed current through the commutator into a different point of the motor windings, which varies the motor torque as required to restore the original angular position and thereby also to keep the spring coupling under constant torsion.

The separate distributor or distributors driven by the servomotor may be arranged to control the current supplied to any number of electric motors driving different apparatus, all of these motors and therefore all of the driven apparatus being kept in synchronism with one another and having their synchronized speeds regulated to a constant value by the servomotor and flywheel group, which thus forms a chronometer or regulating device for all the associated apparatus. This arrangement is mainly intended for use in conjunction with talking films for effecting complete synchronization of all the cameras that may be employed simultaneously in taking a picture and of the sound recording apparatus which may be housed in a separate chamber or department, or for synchronizing the picture projector and the sound apparatus during reproduction.

If desired, suitable means, for example a centrifugal governor, may be employed in connection with the flywheel for controlling a friction brake, the adjustment of which enables the regulated working speed to be varied.

The invention is hereafter described with reference to the accompanying drawings, in which:—

Figure 1:
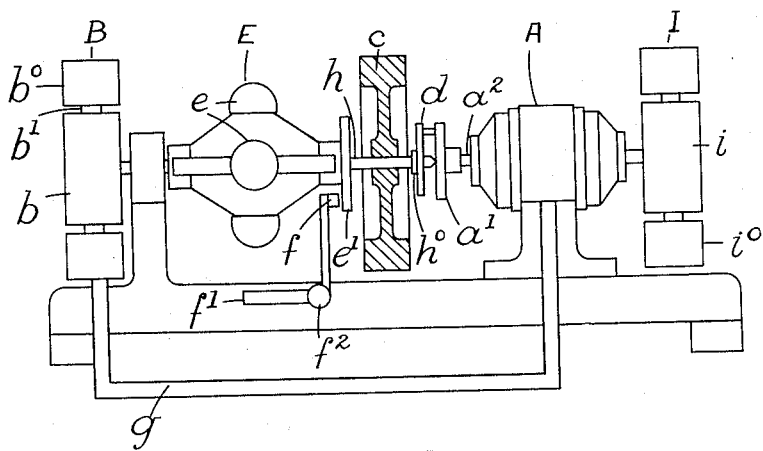
Figure 1 is a diagram illustrating one application of the improved speed-regulating device.

Referring to Figure 1, the electric motor A comprises a wound stator $a$ having for example twelve sections or field coils, and a wound two-pole rotor $a^0$ connected in series or in parallel with the stator, the several sections of the stator winding being controlled by a rotary commutator device B which replaces the commutator of an ordinary electric motor, but is arranged separately and remote from the revolving armature, the rotor or brush-holder $b$ within the stationary commutator segments $b^0$ being secured upon the shaft $h$ of a flywheel $c$ which is mounted coaxially in line with the servomotor A. The flywheel is flexibly coupled in known manner to the motor shaft by any suitable elastic system, for example through the medium of a spring $d$ similar to a spiral clock spring, the inner and outer ends of the spring coil being attached to a boss $h^0$ upon the flywheel shaft $h$ and to a coupling disc $a^1$ on the motor shaft $a^2$ respectively; the two shafts are free to rotate independently in their bearings and can also rotate in relation to one another within the limits permitted by the action of the spring $d$, for example up to thirty degrees in either direction according to the torsional effect.

Between the commutator B and the flywheel $c$, there is mounted a centrifugal governor E, comprising a plurality of weights $e$, the outward movement of which produces the sliding of a collar or disc $e^1$ along the shaft $h$ into engagement with a brake pad $f$, of which the position or pressure can be adjusted manually, as by a lever $f^1$ pivoted at $f^2$. The operation of the brake increases the frictional resistance to motion of the flywheel shaft $h$, and therefore causes the coupling spring $d$ to wind up, with a resulting angular displacement between the two shafts $h\ a^2$.

Figure 2:
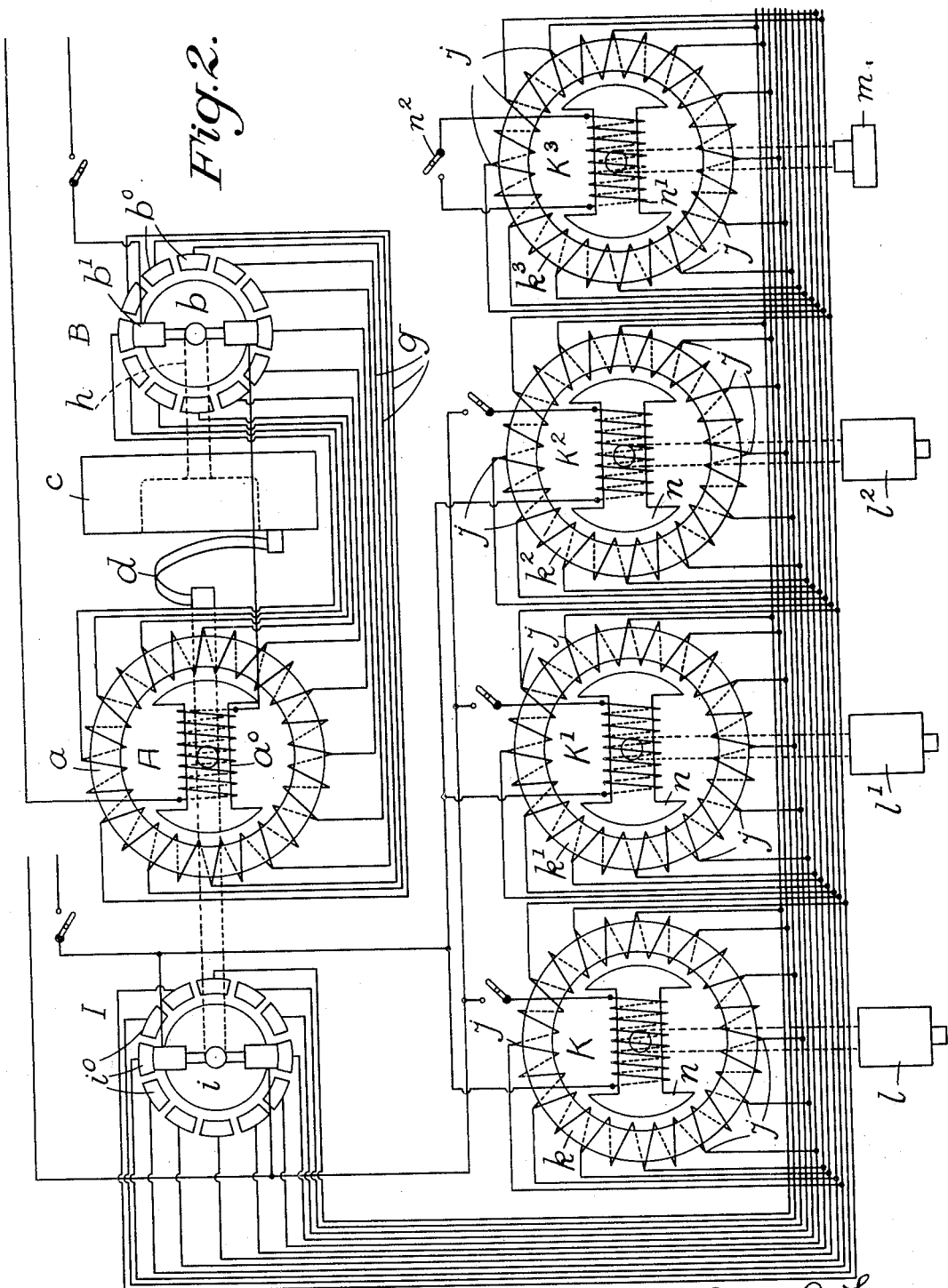
Figure 2 is a diagram of the electrical connections for the synchronization of several associated apparatus by means of the improved speed-regulating device.

The several sections of the stator-winding are connected by a multi-core conductor $g$ to the stationary segments $b^0$ of the commutator B; the revolving brushes $b^1$ of the latter are connected respectively to one pole of the current supply and to one end of the rotor winding, the other end of which is connected to the other pole of supply, in the case of a series-wound machine, as hereafter described with reference to Figure 2.

The motor A may be employed directly for driving any suitable apparatus at constant speed, by means of its shaft $a^2$, but in the preferred arrangement it acts only as a servomotor for regulating one or more other motors which provide the power for driving the apparatus; in this case there is mounted upon the free end of the servomotor shaft $a^2$ a separate distributor I in the form of a commutator, comprising a rotary brush holder $i$ and stationary segments $i^0$, which controls the motor drive to the apparatus or to two or more associated apparatus as hereafter described.

With the motor A at rest, the spring $d$ is not under torsion but the relative position of the two shafts $h\ a^2$ is such that when the voltage is applied, the commutator B feeds current into the sectional windings of the stator $a$ to produce starting torque. As soon as the flywheel begins to rotate, the brushes $b^1$ revolve inside the commutator segments $b^0$, the relative angular position of the two shafts $h\ a^2$ becoming such that the torque produced balances the torsion of the coupling spring $d$, which in turn is equal to the frictional resistance; the flywheel $c$ is thus brought up to its normal floating speed depending upon the electrical design of the motor.

If the speed of the motor should fall, due for example to a fluctuation in the applied voltage, the flywheel $c$ tends to maintain its normal speed; the coupling spring $d$ will therefore unwind and the shaft $h$ will rotate the commutator brushes $b^1$ in advance of the motor shaft $a^2$, so that the current will be fed into the coils of the stator $a$ some few degrees ahead of the rotor poles. This will produce an increased torque in the motor, due to the change in the position of the magnetic flux relative to the rotor, such increased torque tending to restore the speed to normal; a relatively small change in the angular position will increase the torque very considerably, so that the response to the regulating or correcting effect will be very rapid. Conversely, if the motor speed should rise, the displacement of the two shafts $h\ a^2$ will reduce the torque and allow the motor to slow down.

The motor A is thus maintained at a rigorously constant speed, the regulating effect being substantially instantaneous and brought about by a few degrees of relative displacement between the motor shaft and the flywheel, of which the speed can be made as constant as desired by increasing its moment of inertia to a sufficient extent. The motor is thereby enabled to drive the connected apparatus at constant speed, regulated by the chronometer action of the flywheel.

The connected apparatus, represented by the distributor I in Figure 1, may comprise any number of machines separately driven by electric motors controlled by means of a single distributor I or by several such distributors when more than one circuit is necessary. In Figure 2, I have shown four electric motors K $K^1$ $K^2$ $K^3$ adapted to drive associated apparatus, for example three picture cameras $l$, $l^1$, $l^2$ and one sound recording apparatus $m$, under the control of a single distributor I, whereby the four apparatus $l$, $l^1$, $l^2$, $m$ are synchronized with each other and at the same time maintained at constant speed by the regulating effect of the chronometer group A, B, $c$, $d$; the several motors are in fact locked electrically in step, all the armatures being caused to rotate at the same constant speed and within a few degrees of each other.

The servomotor A, commutator B, flywheel $c$, coupling spring $d$ and stator-to-commutator connections $g$ are arranged in the manner already described with reference to Figure 1; the governor E and brake $f$ are omitted, as not necessary to the operation. The distributor I, mounted upon the motor shaft $a^2$, has its commutator segments $i^0$ connected to the junction points $j$ of the divided stator windings of the several electric motors K $K^1$ $K^2$ $K^3$, driving the picture and sound record apparatus $l\ m$ respectively; the stators $k\ k^1\ k^2\ k^3$ of all these motors are preferably fed in parallel, as shown in the diagram. The armatures $n$ of the three motors K $K^1$ $K^2$, are likewise connected in parallel with one another and are shown as arranged in parallel with the distributor-controlled stator windings $k\ k^1\ k^2$, though evidently a series-parallel arrangement might be employed in some cases.

The stator windings are shown as divided into twelve sections, the distributor I having also twelve segments or fixed contacts $i^0$; the number of winding sections and distributor contacts may however be varied, each of the stators being provided for example, with twenty-four or forty-eight sections of field coils, and the distributor I having twenty-four or forty-eight segments $i^0$ to which the tappings from the junction points $j$ of the coils are led.

The motor $K^3$ operating the sound record apparatus $m$ is shown as having its armature winding $n^1$ connected across a short-circuiting switch $n^2$; with this switch in open position, the motor $K^3$ remains at rest, but when the switch is closed to short-circuit the armature winding $n^1$, the motor $K^3$ behaves like an induction motor, the armature revolving in synchronism with the revolving field produced by the distributor-controlled stator winding $k^3$. The sound record apparatus $m$ can thus be cut out of operation without affecting the picture apparatus $l$ driven by the other motors; if preferred, however, the armature winding $n^1$ can be fed with current in parallel with the armatures of the other three motors, with or without a switch for cutting out the motor K³ when desired.

It will be understood that the group formed by the servomotor A, commutator B, flywheel c and coupling d may be applied to regulate the speed of associated picture projecting and sound reproducing apparatus operated in synchronism by one or more electric motors, as well as to analogous purposes. The several motors may be located in any convenient positions, whether in studio or in field work, the regularity of speed and accuracy of synchronism obtained by the electrical connections being equivalent to the direct mechanical coupling of all the motors.

What I claim is:—

1. Electrical means for driving apparatus at constant speed, comprising an electric motor with a separate commutator, means for feeding current through said commutator to windings of said electric motor, a flywheel, resilient means for driving said flywheel by said electric motor, said commutator being driven by said flywheel at constant speed by reason of the flywheel inertia, and said resilient means taking up any small angular displacements between said motor and said flywheel, and positive means for operating the driven apparatus by the rotation of said electric motor.

2. Electrical means for driving apparatus at constant speed, comprising an electric motor having sectional windings and a separate commutator feeding current to the junction points of said sectional windings, a floating flywheel, resilient means for driving said flywheel by said electric motor, said commutator being driven by said flywheel at constant speed by reason of the flywheel inertia, and said resilient means taking up any small angular displacements between said motor and said flywheel, and positive means for operating the driven apparatus by the rotation of said electric motor.

3. Electrical means for driving apparatus at constant speed, comprising a motor shaft, positive means for operating the driven shaft by said motor shaft, a rotor upon said motor shaft, a stator for said rotor, said stator including field coils wound in sections, a floating flywheel, a spring connection coupling said motor shaft and said flywheel, and a commutator driven by said flywheel at constant speed by reason of the flywheel inertia, and said spring connection taking up any small angular displacements between said motor and said flywheel, the field coils of said stator being fed through said commutator.

4. Electrical means for driving apparatus at constant speed, comprising a motor shaft, positive means for operating the driven shaft by said motor shaft, a rotor upon said motor shaft, a stator for said rotor, said stator including field coils wound in sections, a floating flywheel, a shaft for said flywheel, said shaft for said flywheel mounted in line with said motor shaft, a spring connection coupling said shafts together for limited relative rotation, a commutator driven by said flywheel at constant speed by reason of the flywheel inertia, and said spring connection taking up any small angular displacements between said motor and said flywheel, and means for feeding the field coils of said stator through said commutator.

5. Electrical means for driving apparatus at adjustable constant speed, comprising an electric motor with a commutator separate from its rotor, means for feeding current through said commutator to windings of said electric motor, a floating flywheel driving said commutator at constant speed by reason of the flywheel inertia, a spring coupling driving said flywheel from said rotor, said spring coupling taking up any small angular displacements between said motor and said flywheel, means for varying the resistance to rotation of said flywheel, and positive means for operating the driven apparatus by said rotor.

6. A speed regulating device for an electric motor, comprising a floating flywheel, a resilient coupling between said flywheel and said motor, said resilient coupling taking up any small angular displacements between said motor and said flywheel, and a commutator feeding current to windings of said motor, said commutator being separate from the rotor of said motor and being driven by said flywheel at constant speed by reason of the flywheel inertia, and the yield of said resilient coupling being independent of the driving torque exerted by said motor.

ETTORE DE LUCA.